(12) United States Patent
Horvitz et al.

(10) Patent No.: US 8,244,660 B2
(45) Date of Patent: Aug. 14, 2012

(54) OPEN-WORLD MODELING

(75) Inventors: Eric J. Horvitz, Kirkland, WA (US);
John C. Krumm, Redmond, WA (US);
Murugesan S. Subramani, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/194,184

(22) Filed: Jul. 29, 2011

(65) Prior Publication Data
US 2011/0288839 A1 Nov. 24, 2011

Related U.S. Application Data

(63) Continuation of application No. 11/770,541, filed on Jun. 28, 2007, now Pat. No. 7,991,718.

(51) Int. Cl.
*G06F 17/00* (2006.01)
(52) U.S. Cl. ......................................................... 706/45
(58) Field of Classification Search .................... 706/12, 706/21, 45–48, 62; 455/456.1–457; 342/147, 342/450, 451; 340/988–989, 995.19, 995.25; 701/23–37, 200–226
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,353,398 B1 | 3/2002 | Amin et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,672,506 B2 | 1/2004 | Swartz et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |

(Continued)

FOREIGN PATENT DOCUMENTS

WO    WO 9800787    1/1998

OTHER PUBLICATIONS

Krumm et al., Predestination: Inferring Destinations from Partial Trajectories, Sep. 17, 2006, UbiComp 2006, pp. 1-18.*

(Continued)

*Primary Examiner* — David Vincent
(74) *Attorney, Agent, or Firm* — Zete Law, P.L.L.C.; MacLane C. Key

(57) ABSTRACT

The claimed subject matter provides systems and/or methods that facilitate generating an inference about events that may not have yet been observed. Open-world modeling can be used to take a history of observation so as to understand trends over time in the revelation of previously unseen events, and to make inferences with subsets of data that new unseen events will be seen. Thus, inaccuracies associated with predictions generated from incomplete data sets can be mitigated. To yield such predictions, open-world submodels and closed-world submodels that do not allow for previously unseen events can be combined via a model mixture methodology, which fuses inferences from the open- and close-world models.

20 Claims, 14 Drawing Sheets

U.S. PATENT DOCUMENTS

| | | | |
|---|---|---|---|
| 6,837,436 | B2 | 1/2005 | Swartz et al. |
| 6,842,877 | B2 | 1/2005 | Robarts et al. |
| 6,876,326 | B2 | 4/2005 | Martorana |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,385,501 | B2 | 6/2008 | Miller et al. |
| 7,565,157 | B1 | 7/2009 | Ortega et al. |
| 7,693,817 | B2 | 4/2010 | Dumais et al. |
| 7,739,210 | B2 | 6/2010 | Horvitz et al. |
| 7,779,015 | B2 | 8/2010 | Abbott et al. |
| 7,831,679 | B2 | 11/2010 | Apacible et al. |
| 7,925,995 | B2 | 4/2011 | Krumm et al. |
| 7,979,252 | B2 | 7/2011 | Horvitz et al. |
| 7,991,718 | B2 | 8/2011 | Horvitz et al. |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0139482 | A1 | 7/2004 | Hale et al. |
| 2004/0201500 | A1 | 10/2004 | Miller et al. |
| 2004/0266457 | A1 | 12/2004 | Dupray |
| 2005/0034078 | A1 | 2/2005 | Abbott et al. |
| 2005/0266858 | A1 | 12/2005 | Miller et al. |
| 2005/0272442 | A1 | 12/2005 | Miller et al. |
| 2006/0010206 | A1 | 1/2006 | Apacible et al. |
| 2006/0019676 | A1 | 1/2006 | Miller et al. |
| 2006/0276201 | A1 | 12/2006 | Dupray |
| 2007/0006098 | A1 | 1/2007 | Krumm et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |
| 2008/0319727 | A1 | 12/2008 | Horvitz et al. |
| 2009/0055752 | A1 | 2/2009 | Abbott et al. |
| 2010/0262573 | A1 | 10/2010 | Abbott et al. |
| 2011/0093787 | A1 | 4/2011 | Abbott et al. |
| 2011/0161276 | A1 | 6/2011 | Krumm et al. |

OTHER PUBLICATIONS

Krumm et al., Driver Destination Models, Jun. 25, 2007, Springer-Verlag Berlin Heidelberg, pp. 1-5.*

Krumm et al., Predestination: Where Do You Want to Go Today?, Apr. 2007, Microsoft Research, pp. 1-3.*

Pending, unpublished U.S. Appl. No. 12/389,187, filed Feb. 19, 2009.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et aL, Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, in the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et aL, In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Zhang et al., Forecasting with aertificial neural networks: The state of the art, 1998, Elsevier International Journal of Forecasting 14, pp. 35-62.

International Search Report completed and mailed Dec. 12, 2008 for PCT Application Serial No. PCT/US2008/67808, 8 pages.

* cited by examiner

OPEN-WORLD MODELING

RELATED APPLICATION

This application is a continuation of U.S. application Ser. No. 11/770,541, filed Jun. 28, 2007 now U.S. Pat. No. 7,991, 718, entitled "Method and Apparatus for Generating an Inference About a Trip Using a Combination of Open-World Modeling and Closed World Modeling" which is incorporated by reference in its entirety.

BACKGROUND

Technological advances in computer hardware, software and networking have lead to efficient, cost effective computing systems (e.g., desktop computers, laptops, handhelds, cellular telephones, servers, etc) that can provide inferences about future activities and/or occurrences. These systems continue to evolve into more reliable, robust and user-friendly systems. Oftentimes, pervasive computing applications that provide inferences about future activities can utilize data about the past; thus, such applications can be limited by their reliance on the limits of a current data set.

In a traditional closed-world approach to learning from data, current data points in a current data set can be considered as the basis for inferences. For example, a closed-world system designed to predict probability distribution over a person's current destination while the person is traveling, based on such observations of the time of day of the travel, and on the progression of the current trip, is conventionally limited to considering prior locations seen to be visited in a log of tours. Limitations in a database can have several sources. For instance, data collection can be costly in many research and application projects. Further, a lack of ongoing embedded sensing (which can be especially prevalent during early prototyping efforts) can mitigate an amount of time during which data can be collected. Also, privacy concerns may lead to access to only small windows of data. Moreover, even always-on monitoring systems can be associated with incompleteness as previously unobserved data can continue to be observed. According to an example, a person's destinations can be logged for an extended period of time, yet the person can continue to visit places that she has not been observed to have visited before. These previously unobserved places can be locations that the person did not visit during monitoring, yet had traveled to prior to such monitoring. Additionally or alternatively, the traveler may have never before visited these previously unobserved places. Thus, conventional techniques that generate predictions about a user's current or future activity can yield inaccurate results.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate generating an inference. Open-world decomposition can be employed to facilitate yielding predictions based upon probabilities associated with observed data as well as non-observed data, and thus, inaccuracy associated with predictions generated from incomplete data sets can be mitigated. To yield such predictions, open-world submodels and closed-world submodels can be combined utilizing a submodel weight, which can fuse probabilities associated with observed and unobserved data.

In accordance with various aspects of the claimed subject matter, a modeling component can generate predictions based at least in part upon an open-world model that extrapolates a set of observed data and provides probabilities related to non-observed data. The modeling component can extrapolate from the observed data to reason about the influence of uncollected data. Thus, the modeling component can provide an explicit manner by which to consider expectations about future data, based on the learning of forecasts about expected changes in data sets over a period of time extending beyond an observation horizon.

Pursuant to one or more aspects of the claimed subject matter, the modeling component can leverage a closed-world submodeling component and/or an open-world submodeling component. The closed-world submodeling component can perform inferences based upon a closed set of prior data. The open-world submodeling component can explicitly consider a likelihood of observing situations and/or activities that have not been previously observed over a future time period. For instance, probabilities can be distributed to previously non-observed data uniformly, based upon spatial distribution, etc. The inferences yielded by the closed and open-world submodeling components can be combined by considering a probability (e.g., submodel weight) that a particular assumption (e.g., closed or open-world assumption) is correct in a particular situation.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
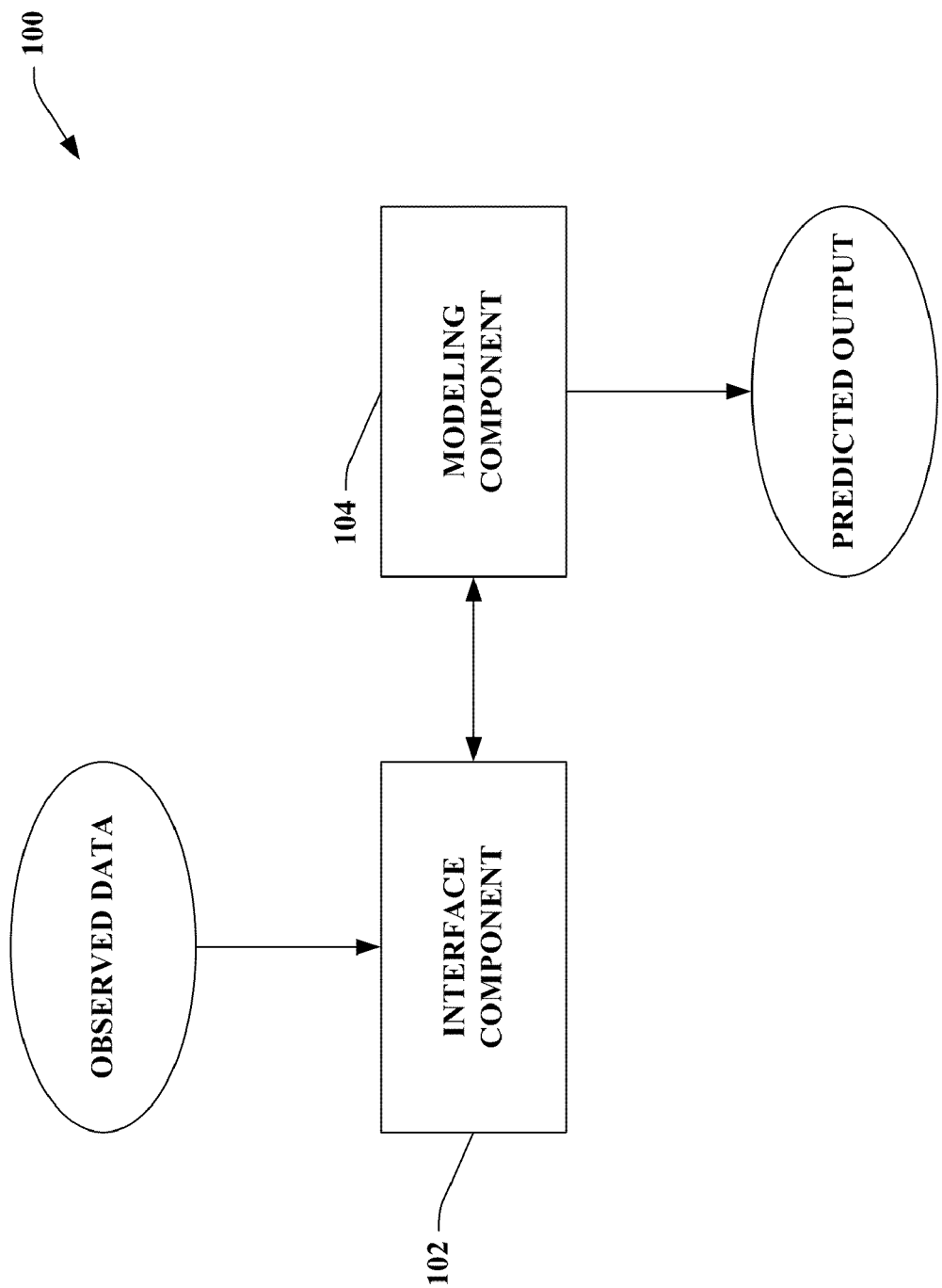
FIG. 1 illustrates a block diagram of an exemplary system that facilitates generating an inference to yield a predicted output.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates generating an inference to yield a predicted output. The system 100 can output an inference related to any future activity and/or occurrence. The system 100 includes an interface component 102 that receives observed data. For instance, the interface component 102 can obtain observed data associated with a current session and/or previous session(s). By way of illustration, the interface component 102 can obtain observed data that can be logged in a database. Further, the interface component 102 can receive observed data yielded from a disparate component (not shown) that can monitor current activities, conditions, and so forth. Moreover, the observed data can be associated with a particular user and/or disparate users. Additionally, the interface component 102 can capture an evolution of observations over time.

The interface component 102 can receive observed data that can relate to any activity and/or occurrence. The observed data can be associated with people, machines, nature, etc. Further, the observed data can be monitored by way of any type of component (e.g., timer, scale, sensor, meter, locating component such as global positioning system (GPS), user interface that receives explicit user input, . . . ) and such component can provide the observed data to the interface component 102. By way of illustration, the interface component 102 can receive data related to travel of a user (e.g., to predict destination(s)). According to this illustration, the interface component 102 can obtain data related to the user's current location, length of time of travel associated with a current trip, previous observed travel history (e.g., previous visited destination(s)), user's preferences, user's needs, data associated with other users, and so forth. Pursuant to another example, the observed data obtained by the interface component 102 can relate to natural conditions such as weather (e.g., temperature, precipitation, . . . ), natural disasters (e.g., occurrence and/or strength of an earthquake, hurricane, tornado, . . . ), and the like. Moreover, the interface component 102 can obtain observed data related to a living organism and/or a machine. However, it is to be appreciated that any type of observed data can be obtained by the interface component 102 and utilized in connection with generating inferences associated with future activities and/or occurrences.

The observed data can be provided by the interface component 102 to a modeling component 104 that can generate prediction(s) (e.g., predicted output) of events based at least in part upon an open-world model that extrapolates the observed data and provides probabilities related to non-observed data. For example, the open-world model can provide probabilities of events that have not been observed. Open-world modeling can provide explicit knowledge about the limited nature of current data sets (e.g., the observed data). Further, such open-world modeling techniques can yield an explicit manner by which to consider expectations about future data, based on the learning of forecasts about expected changes in data sets over a period of time extending beyond an observation horizon. The modeling component 104 can extrapolate data sets based on observed trends. According to the above destination prediction example, the modeling component 104 can enable leveraging models that characterize how observational data can change given ongoing data collection about subjects' destinations; such characterizations can be utilized to improve accuracy associated with predictions.

The modeling component 104 can extrapolate from the observed data (e.g., data set(s)) so as to reason about the influence of uncollected data (e.g., reason about a likelihood of seeing previously unobserved states given a specific observational context). Thus, the modeling component 104 can provide a degree of reflection about model incompleteness. The modeling component 104 can extrapolate probabilistic models by learning functions over parameters that describe how data completeness changes as a database grows. For example, the modeling component 104 can perform trend analysis on parameters of probability functions and then utilize these parameters, along with measures, such as an amount of time to project into the future, to build more comprehensive models.

The modeling component 104 can yield the predicted output. It is to be appreciated that the predicted output can be provided to a user and/or a disparate component. According to an example, the predicted output can be presented to the user by way of an audible and/or visual signal. Thus, for instance, the predicted output can be destination(s) to which the user is predicted to travel; accordingly, such data can be outputted by graphically displaying the location on a map and/or generating an audible indication with a speaker (e.g., to provide directions to the destination(s), nearby points of interest, . . . ). However, it is to be appreciated that the claimed subject matter is not so limited.

Although the interface component 102 is depicted as being separate from the modeling component 104, it is contemplated that the modeling component 104 can include the interface component 102 or a portion thereof. Also, the interface component 102 can provide various adaptors, connectors, channels, communication paths, etc. to enable interaction with the modeling component 104.

Figure 2:
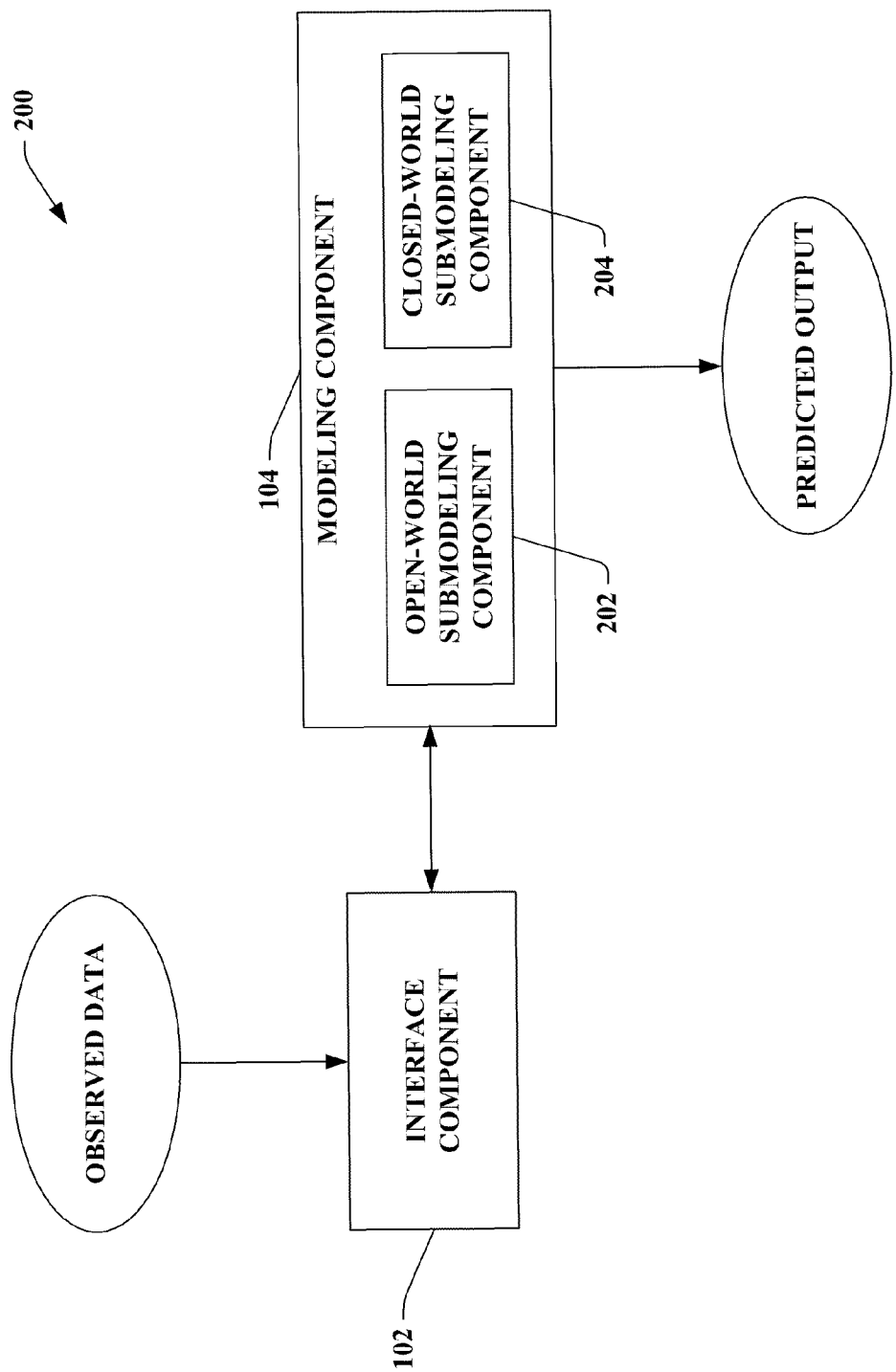
FIG. 2 illustrates a block diagram of an exemplary system that effectuates open-world decomposition to generate a predicted output.

Turning to FIG. 2, illustrated is a system 200 that effectuates open-world decomposition to generate a predicted output. The system 200 can include the interface component 102 that obtains observed data and provides the observed data to the modeling component 104. The modeling component 104 can handle incompleteness in a data set associated with the observed data and can reason from previous trends as to how unobserved data can be included in a probabilistic analysis. The modeling component 104 can facilitate performing open-world decomposition by utilizing an open-world submodeling component 202 and a closed-world submodeling component 204.

The closed-world submodeling component 204 can employ a closed-world analysis associated with the observed data. For instance, the closed-world submodeling component 204 can perform inferences based on prior data, and can consider the data collected as a representation of a user or other aspects of the universe at future times. The closed-world submodeling component 204 can generate predictions based upon a corpus of the observed data. It is contemplated that the closed-world submodeling component 204 can employ a Bayes classifier, histogram matching, a hidden Markov model (HMM) representation, a Markov model, and so forth to effectuate the closed-world analysis. According to the destination prediction example, the closed-world submodeling component 204 can examine points at which a traveler's trip concluded and make a histogram over N cells. Normalizing gives a probability mass function $P_{closed}(D=i)$, i=1, 2, 3, . . . , N, where the closed subscript indicates that this probability is based on previously observed destinations. If a user has not been observed to have visited a cell, the probability for that cell can be zero.

The open-world submodeling component 202 can explicitly consider the likelihood of observing, over a future period of time, situations or activities that have not been previously observed. Also, the open-world submodeling component 202 can learn about properties that describe the nature and distribution of previously unseen situations. The open-world submodeling component 202 can shape and/or condition such likelihoods upon prior observations (e.g., observed data). For example, the open-world submodeling component 202 can model previously unvisited destinations based upon an observation that destinations tend to cluster. By way of illustration, users may tend to go to places near each other to save time, or to overall regions they are familiar with (e.g., drivers might chose gas stations and grocery stores that are near their place of work). The open-world submodeling component 202 can model this effect as a discretized probability distribution over the distance from previously visited points; however, the claimed subject matter is not so limited.

Further, the modeling component 104 can combine inferences from both the open-world submodeling component 202 and the closed-world submodeling component 204. The modeling component 104 can combine the inferences in any manner. For example, the inferences can be statically fused and/or the modeling component 104 can dynamically alter how the disparate inferences are combined. According to an illustration, the modeling component 104 can place greater emphasis upon the open-world inference from the open-world submodeling component 202 initially during monitoring when the observed data is sparse and, as the size of the set of observed data increases, consideration of the closed-world inference generated with the closed-world submodeling component 204 can increase within the combination.

Figure 3:
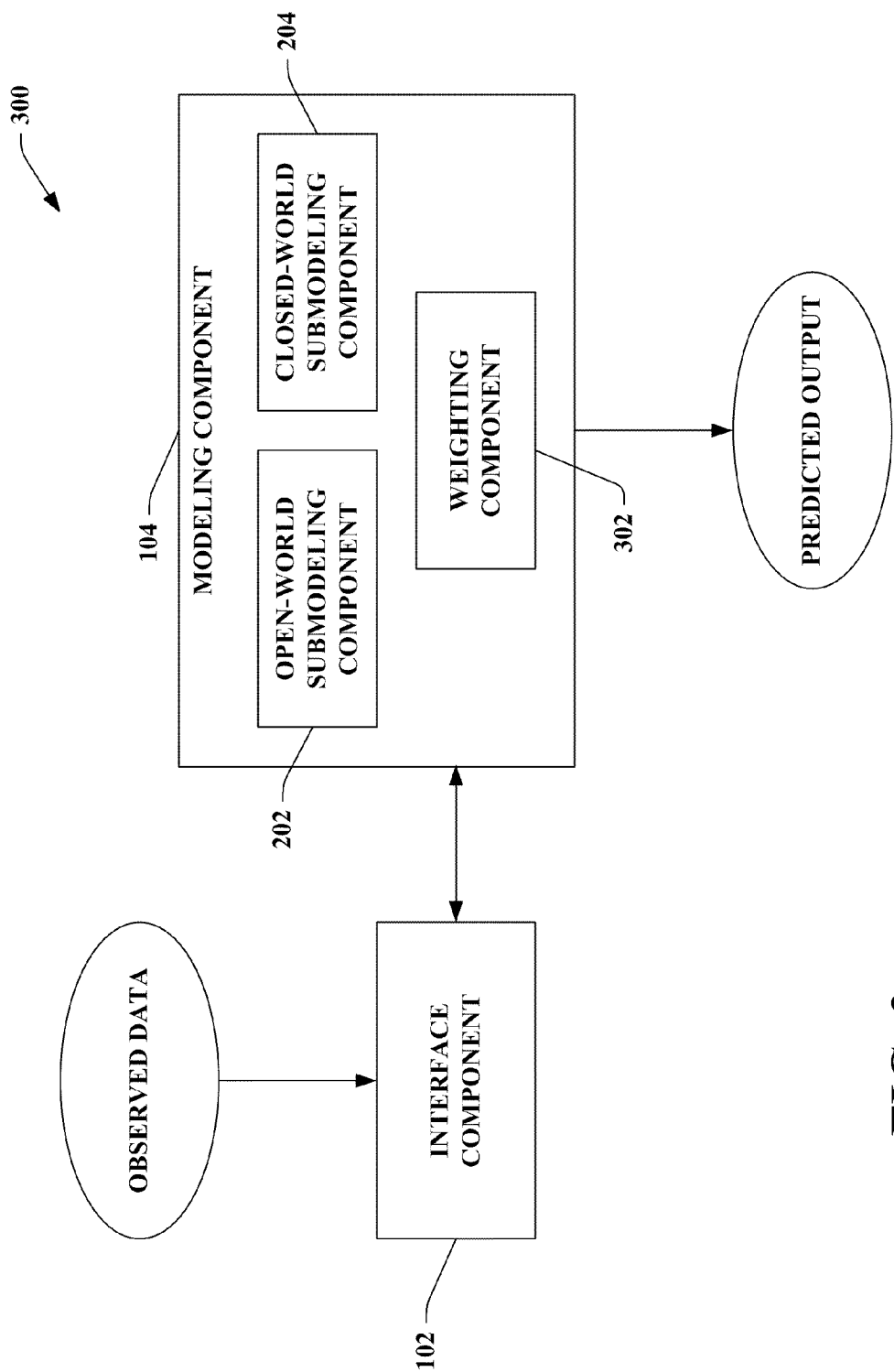
FIG. 3 illustrates a block diagram of an exemplary system that fuses open and closed-world inferences to generate a combined inference.

Now referring to FIG. 3, illustrated is a system 300 that fuses open and closed-world inferences to generate a combined inference. The system 300 includes the interface component 102 that obtains observed data and the modeling component 104, which can further include the open-world submodeling component 202 and the closed-world submodeling component 204, that utilizes the observed data to generate predicted output(s). The modeling component 104 can also include a weighting component 302 that can combine the models generated with the open-world submodeling component 202 and the closed-world submodeling component 204.

The weighting component 302 can consider a probability that a particular assumption (e.g., closed-world assumption, open-world assumption) is correct in a particular situation. For instance, $p(\kappa|E)$ can be the probability that the closed-world assumption is correct in a particular situation. Pursuant to the above destination prediction example, this probability can be the likelihood that, given a tour in progress, a user will visit a destination that has been observed to have been visited in the past. In contrast, traditional closed-world destination prediction techniques oftentimes compute the likelihoods of future destinations based solely on a consideration of the set of destinations observed to have been visited in the logs recorded by a user's GPS up to the observation horizon, including situations where such a horizon extends up to the current time.

The closed-world submodeling component 204 can generate predictions about the future based on observations made by a snapshot of observations that have been previously seen. However, a previously unobserved activity or occurrence can happen for a first time such as, for example, a subject may visit a location for the first time or revisit a previously unobserved location. The weighting component 302 can evaluate a likelihood, $p(\omega|E)$, that the closed-world model, which considers only previously observed data, will fail (e.g., situations where a new location will be visited, . . . ). The probability $p(\kappa|E)$ that the closed-world assumption is correct in any situation can be $1-p(\omega|E)$.

The open-world submodeling component 202 and the closed-world submodeling component 204 can be utilized to build separate open and closed-world submodels, respectively. The weighting component 302 can further enable the modeling component 104 to fuse evidence from both submodels to infer appropriate likelihoods over destinations. For instance, the weighting component 302 can perform model averaging where, in light of independence assumptions, the probability distributions provided by the two submodeling components 202-204 can integrated, weighted by the likelihoods that each model is correct. Thus, inference about the likelihood of a destination $D_i$ given other contextual evidence E about the situation, based on the closed-world assumption, $p(D_i|E)$, can be obtained as follows:

$$p(D_i|E)=(1-p(\omega|E))p(D_i|\kappa,E)+p(\omega|E)p(D_i|\omega,E)$$

Often the probability that the closed world model is correct, $p(\kappa|E)$, will grow as more observed data becomes available.

Further, an open-world modeling parameter, t, can be utilized to represent how aspects of the open-world model, and the interactions between the open and closed-world models, change with such aspects as the duration of data collection. Pursuant to an illustration, for an open-world location prediction system, t can refer to an amount of time that a subject has been monitored.

$$p(D_i|E)=(1-p(\omega|E,t))p(D_i|\kappa,E,t)+p(\omega|E,t)p(D_i|\omega E,t)$$

To simplify the above equation, $\alpha(t)$ can be utilized to refer to $p(\omega|E,t)$. The weighting component 302 can evaluate the likelihood that the closed-world assumption obtained by way of the closed-world submodeling component 204 will fail. Thus, for example, the weighting component 302 can determine whether a submodel should be folded into the computation of the likelihood of a user destination, given a log of trips and destinations that a user has taken. Moreover, t can be the number of days that a user's travels and pauses at destinations have been observed.

By way of illustration, to compute a subject's destination on a current trip that is in progress, the closed-world submodeling component 204 can be employed by utilizing a set of predictive techniques to infer the likelihood of alternate destinations, considering that the prior probabilities over destinations can be generated only from the locations seen to have been visited in the log. Moreover, the open-world submodeling component 202 can be employed to obtain a probability that a user will visit a previously unobserved location. The weighting component 302 can facilitate evaluating a likelihood, $1-\alpha(t)$, that a previously observed location will be visited and a likelihood, $\alpha(t)$, that a user will visit a new location. Accordingly, the likelihood of future potential destinations can be evaluated as follows:

$$p(D_i|E)=(1-\alpha(t))p(D_i|\kappa,E,t)+\alpha(t)p(D_i|\omega,E,t)$$

Figure 4:
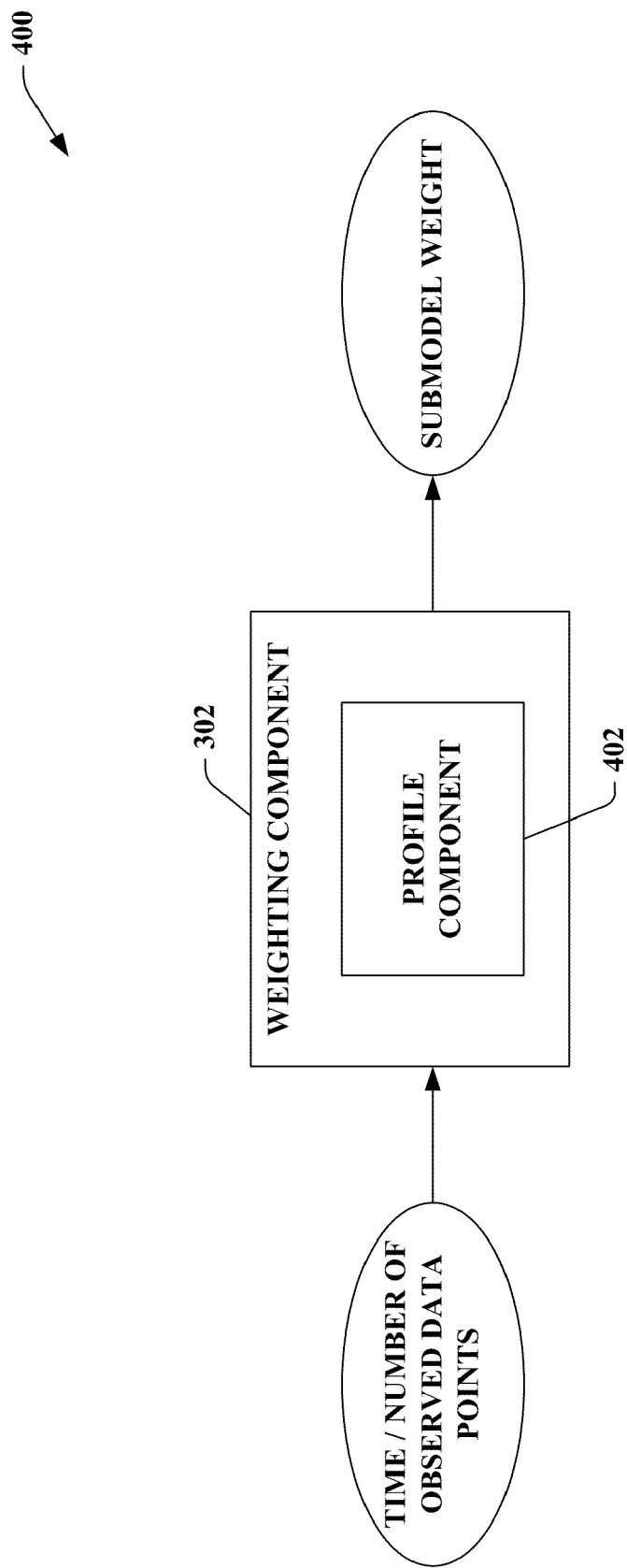
FIG. 4 illustrates a block diagram of an exemplary system that generates a weight to be utilized in connection with combining inferences yielded with an open-world submodel and a closed-world submodel.

Now turning to FIG. 4, illustrated is a system 400 that generates a weight to be utilized in connection with combining inferences yielded with an open-world submodel and a closed-world submodel. The system 400 includes the weighting component 302 that can consider factors such as, for instance, an amount of time and/or a number of observed data points in connection with yielding a submodel weight. According to an example, the submodel weight can be the likelihood that a user will visit a previously unvisited location as a function of time, $\alpha(t)$, where t can represent the day of data collection, starting with a subject's first day. The weighting component 302 can further include a profile component 402 that can generate a weight based upon a consideration of user related characteristics.

The weighting component 302 can derive a function that describes $\alpha(t)$ via extrapolation over varying observation horizons of an existing log of destinations. Such a computation can be performed for single users and/or all users. Pursuant to another example, a subset of the users (e.g., users with similar demographic properties as identified by the profile component 402) can be utilized to derive the function related to $\alpha(t)$. In accordance with an illustration, the number of days of observation (e.g., Nth day of observation, where N is a positive integer) can be utilized by the weighting component 302 to determine a number of new destinations visited compared to a total number of destinations visited. The fraction of new destinations to total destinations for a day can yield a rough estimate of the probability of visiting a new destination each day, which can be $\alpha(t)$ for a model that predicts new destinations for a day. Further, the fraction obtained by way of the weighting component 302 can be converted to the likelihood that a new destination will be visited on any particular trip.

The weighting component 302 can yield $\alpha(t)$, which can decay in value, for example. Such decay can be associated with new destinations becoming increasingly rarer as subjects approach their steady states of visiting new locations. The steady state can be close to zero for some people, given the regularity of patterns of activity and destination visitation.

The weighting component 302 can evaluate a current $\alpha(t)$ and/or project $\alpha(t)$ beyond a time frame associated with observed data. To project $\alpha(t)$, the weighting component 302 can employ curve fitting to model the change in the likelihood that a user will visit a new location over time. For example, the weighting component 302 can utilize decreasing exponential models such as $\alpha(t)=ae^{-bt}$, which decays to zero, $\alpha(t)=ae^{-bt}+c$, which decays to a constant value of seeing new locations as time proceeds, and so forth.

Moreover, the profile component 402 can enable forecasting for specific users such that $\alpha(t)$ trajectories can be learned for subgroups of people that share similar demographics. By way of illustration, the profile component 402 can consider a user's gender, whether the user is single or living with a partner, parental status, employment type, religion, age, race, political affiliation, and so on to tailor the submodel weight to a particular user.

Figure 5:
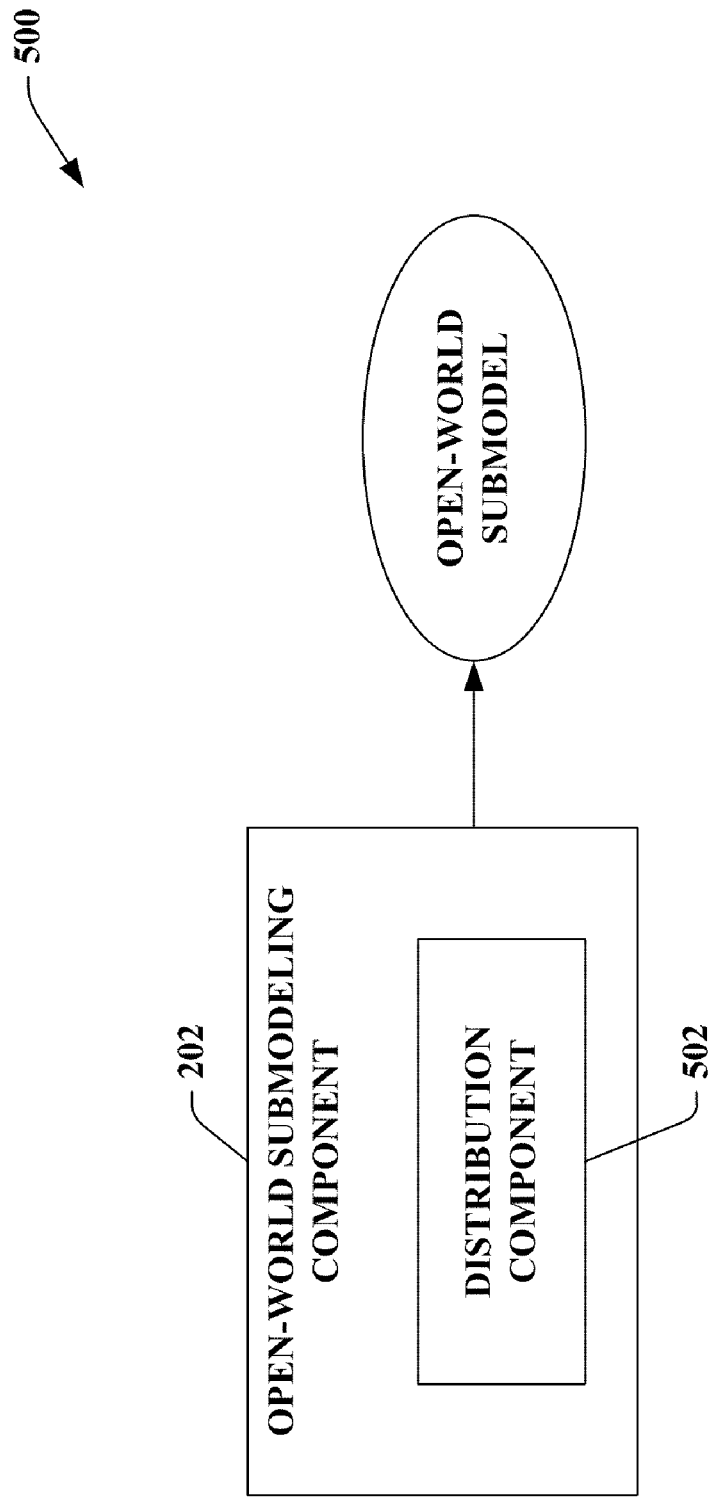
FIG. 5 illustrates a block diagram of an exemplary system that facilitates distributing probabilities associated with previously unobserved data for utilization in connection with open-world modeling.

With reference to FIG. 5, illustrated is a system 500 that facilitates distributing probabilities associated with previously unobserved data for utilization in connection with open-world modeling. The system 500 includes the open-world submodeling component 202 that generates an open-world submodel. The open-world submodeling component 202 can further include a distribution component 502 that distributes probabilities related to data that has not previously been observed.

According to an illustration, the distribution component 502 can spread the probability homogeneously over all previously unobserved data. Thus, for instance, the probability associated with new locations can uniformly be distributed over all previously unvisited locations by the distribution component 502.

Pursuant to a further example, the distribution component 502 can learn parameters and trends of parameters to spread the probability in more sophisticated manners; accordingly, the distribution component 502 can reason about how to distribute probabilities associated with previously unobserved data. The distribution component 502 can effectuate an analysis of spatial trends in the visiting of new locations, for example, which may reveal that new destinations are often physically close to previously visited destinations. Further, the distribution component 502 can utilize a structural scaffolding of previously identified trips and destinations as parameters for conditioning such analysis; thus, data can be collected and models can be built that forecast how new points can be laid down over time, based on distance statistics from routes and/or locations. For instance, the distribution component 502 can provide spatial considerations by evaluating a probability distribution over the distance of the new points from the previous points already visited. Additionally or alternatively, the distribution component 502 can consider a frequency of tours and visitations.

Figure 6:
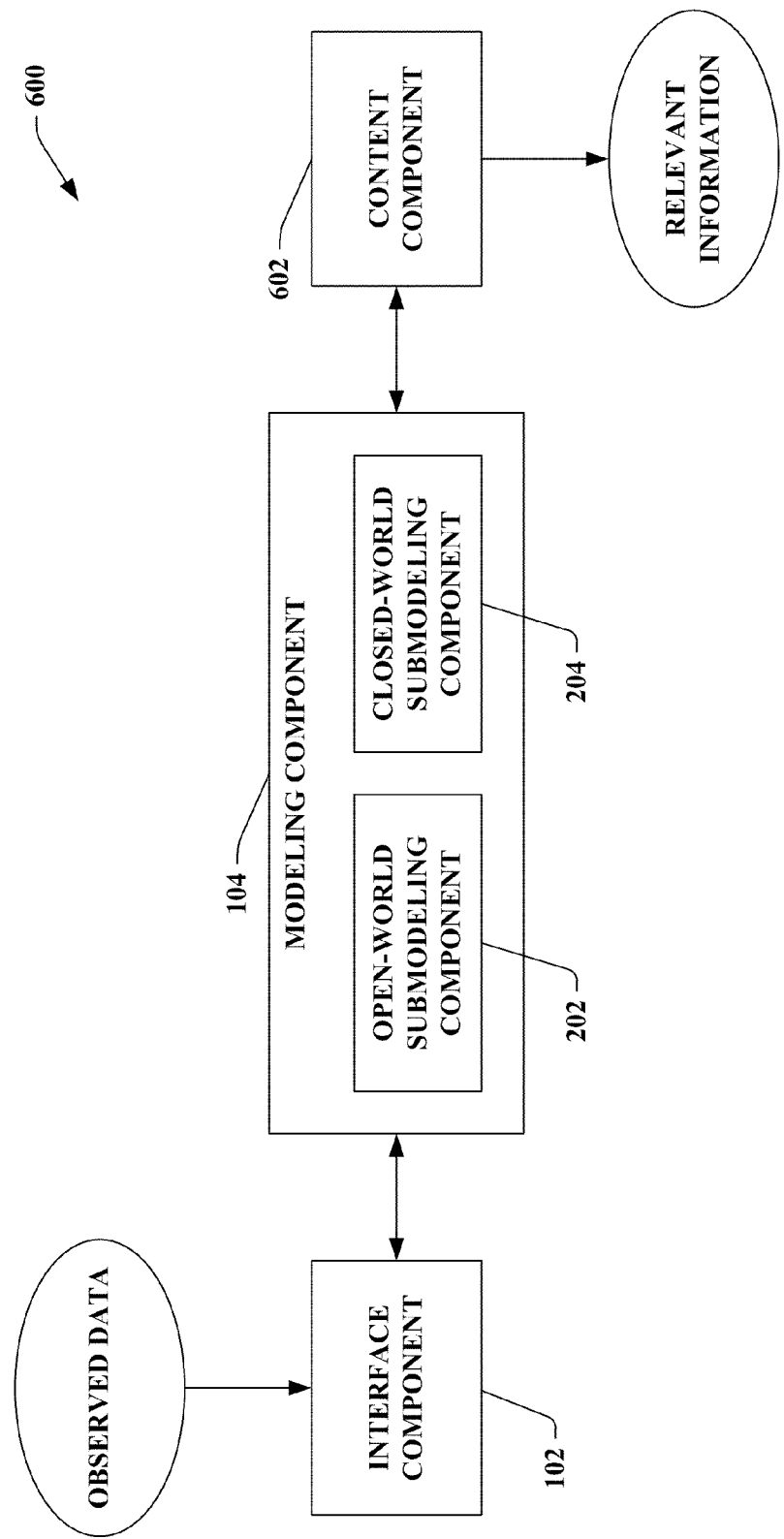
FIG. 6 illustrates a block diagram of an exemplary system that provides information that can be relevant to predicted output(s).

Referring now to FIG. 6, illustrated is a system 600 that provides information that can be relevant to predicted output(s). The system 600 includes the interface component 102 that receives observed data and the modeling component 104 that effectuates generating a prediction based upon a combination of open and closed-world analyses by leveraging the open-world submodeling component 202 and the closed-world submodeling component 204. The predicted output(s) yielded by the modeling component 104 can further be provided to a content component 602 that provides relevant information associated with the predicted output(s).

For example, if the modeling component 104 is generating predicted destination(s), the content component 602 can provide traffic warnings, information related to construction, safety issues ahead, advertisements, directions, routing advice, restaurants, landmarks, gas stations, and so forth. According to another illustration, if the modeling component 104 provides predicted output(s) related to weather conditions, the content component 602 can provide corresponding advertisements (e.g., advertisement for a golf course when the weather is clear, . . . ), instructions (e.g., where to go within a building during a tornado, . . . ), and so forth. Moreover, if the modeling component 104 is generating predicted output(s) corresponding to diagnosing a medical condition of a user, the content component 602 can yield additional information pertaining to such medical condition (e.g., symptoms, treatments, . . . ). However, it is to be appreciated that the claimed subject matter is not limited to the aforementioned examples. Additionally or alternatively, the content component 602 can customize the types of information provided to a user based upon one or more preferences.

Further, although not shown, it is to be appreciated that the interface component 102 can obtain at least a portion of the observed data or information derived from the observed data from a data store. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 7:
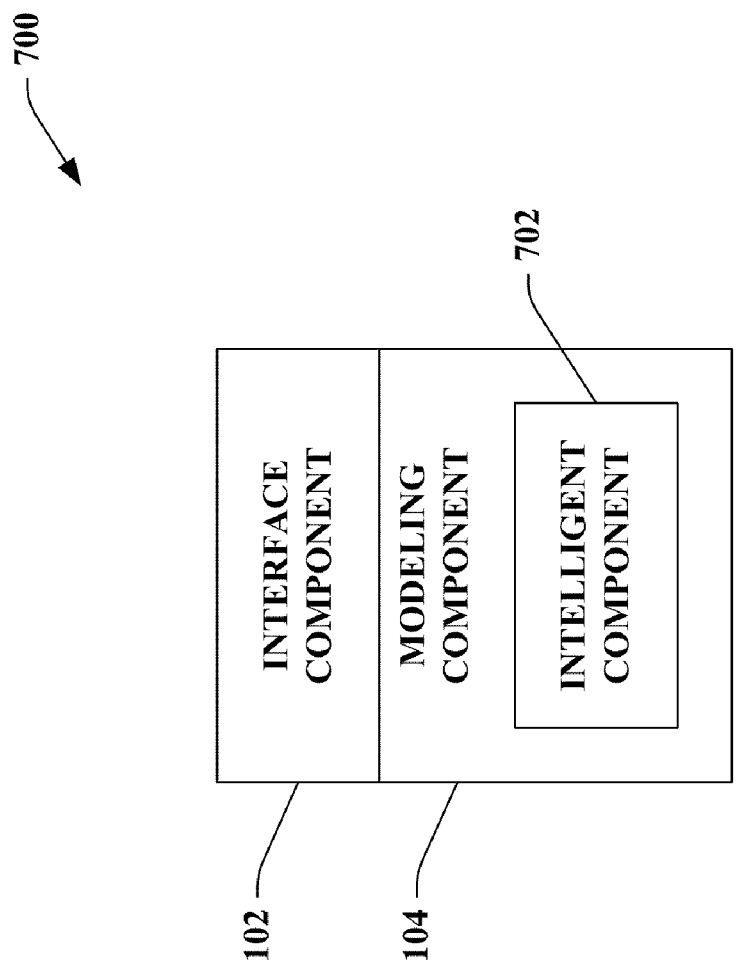
FIG. 7 illustrates a block diagram of an exemplary system that facilitates generating an inference based upon open and closed-world modeling considerations.

Turning to FIG. 7, illustrated is a system 700 that facilitates generating an inference based upon open and closed-world modeling considerations. The system 700 can include the interface component 102 and the modeling component 104, each of which can be substantially similar to respective components described above. The system 700 can further include an intelligent component 702. The intelligent component 702 can be utilized by the modeling component 104 to facilitate reasoning about how to fuse an open-world inference with a closed-world inference. Pursuant to another illustration, the intelligent component 702 can enable determining a group of users that is similar to a particular user to facilitate generating a weight for combining disparate inferences, and thus, the intelligent component 702 can enable the modeling component 104 to leverage observations from similar actors. Moreover, the open-world submodeling component 202 and/or the closed-world submodeling component 204 (both of FIG. 2) can employ the intelligent component 702 in connection with reasoning about likelihoods.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

According to another illustration, rich inferential models can be directly constructed via machine learning for directly generating p(new destination|E), where E is the current set of observations about a specific trip, and p(new destination|E) is the likelihood of seeing a new destination at the end of the current trip, given a database built from multiple classes of evidence (e.g., demographics, observational history, and driving dynamics). A very rich model can be learned, and such model can provide a context-sensitive signal that a new event will be seen in the current context, which is dynamically updated during a trip, can be fed into the open-world model. For example, the probability that a user will be headed to a new destination versus to a destination visited previously can be learned. Moreover, a classifier can be built that can report the probability that a user will be visiting a previous destination and the likelihood of each destination. Additionally, models can be built that directly predict that a destination will be one that a system has not yet observed a driver traveling to given the observation period. These predictive models can be utilized in open-world analyses that understand when a driver is traveling to a new location.

A model can be learned with probabilistic machine learning that considers a set of variables including demographics of the driver, characteristics of the data set, and driving dynamics. For example, in models that have been learned to predict the likelihood that a user will be headed to a new location, the following variables can be included:

Demographics:
    Children/No children and ages of children
    Single/married
    Age
    Gender
    Extended family in area
Driver observation horizon
    Number of trips observed so far
    Number of days that driver has been observed
    Mean trips per day for driver
Real-time driving dynamics
    Distance traveled so far in current trip
    Driving efficiency statistics based on current and longer-term computed driving efficiencies to each prior destination On the latter, measures of driving efficiency to locations, including prior destinations, can be qualified using the driving time between points on the driver's path and the locations, such as the prior destinations. That is, for each cell and destination (i,j) in a grid of locations, the driving time $T_{i,j}$ can be estimated between them. For example, the Euclidian distance can be utilized as an approximation between each pair of cells. Another approach can employ a routing system to compute the best path between a destination and the cells a user started at or is currently.

As a trip progresses, the time to the destination can be expected to decrease. Thus, the distance from each destination as a trip progresses can be updated and the ratio of this change can be considered with the current driving and the change that one would expect from taking the most efficient route; accordingly, the ratio between these two measures can be utilized as a measure of driving efficiency to each prior destination. Variables that include the max, min, and mean driving efficiencies over all the efficiencies of all prior destinations can be considered as evidence in machine learning to predict a new versus prior destination. Further, these efficiencies can be considered at the current time, or for multiple steps during travel (e.g., for the last n steps, where n can be substantially any integer).

The following provides multiple variables as instantiations of the core driving efficiency computation for use in the learning of predictive models for open-world modeling techniques:

Driving efficiency statistics
    Minimum driving efficiency considering each prior destination
    Mean driving efficiency over all prior destinations
    Mean of maximum efficiency seen so far during the trip across all prior destinations
Driving efficiency polarity statistics The driving efficiency polarity can refer to a qualitative abstraction with whether a driver is heading towards or away from a prior destination. Further, statistics can be created of polarities considering multiple prior destinations.

Figure 8:
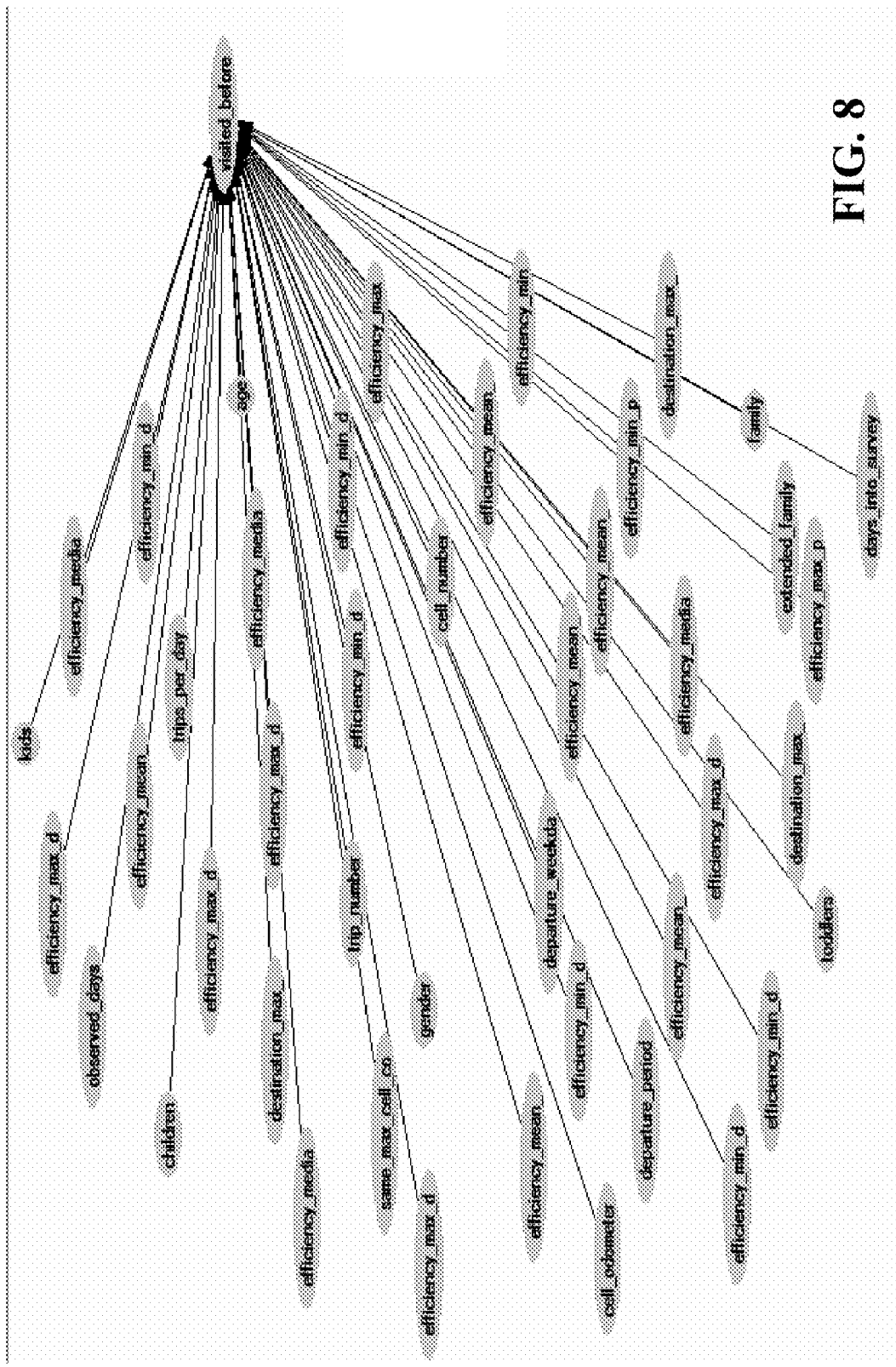
FIGS. 8 and 9 illustrate example graphical models.
Figure 9:
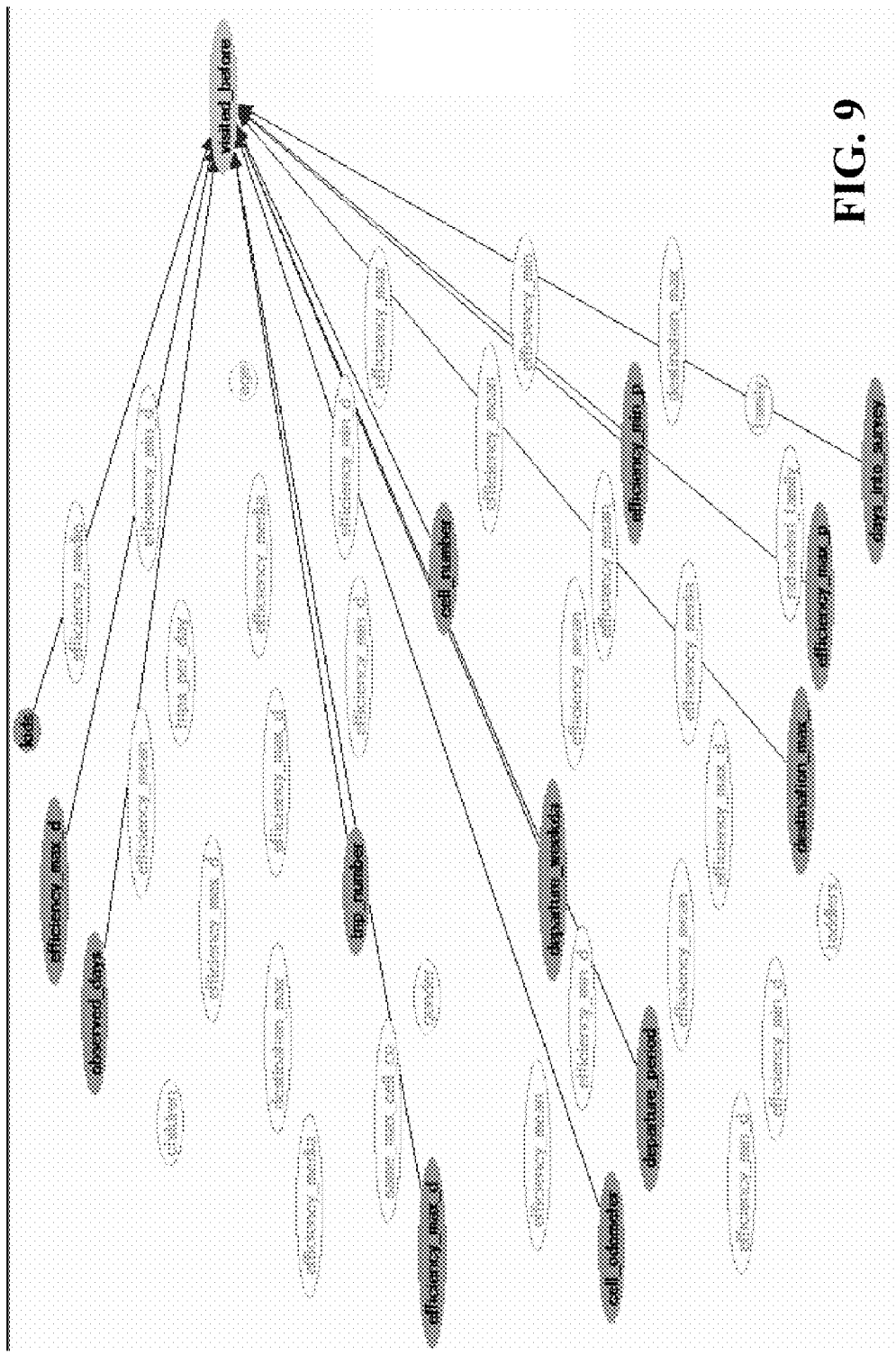

FIGS. 8 and 9 illustrate example graphical models pertaining to the foregoing description. Referring to FIG. 8, illustrated is a learned graphical model. Turning to FIG. 9, depicted are some of the more discriminating variables for predicting whether or not a user will be headed to a new destination. It is to be appreciated that the claimed subject matter is not so limited to the examples provided in FIGS. 8 and 9.

Figure 10:
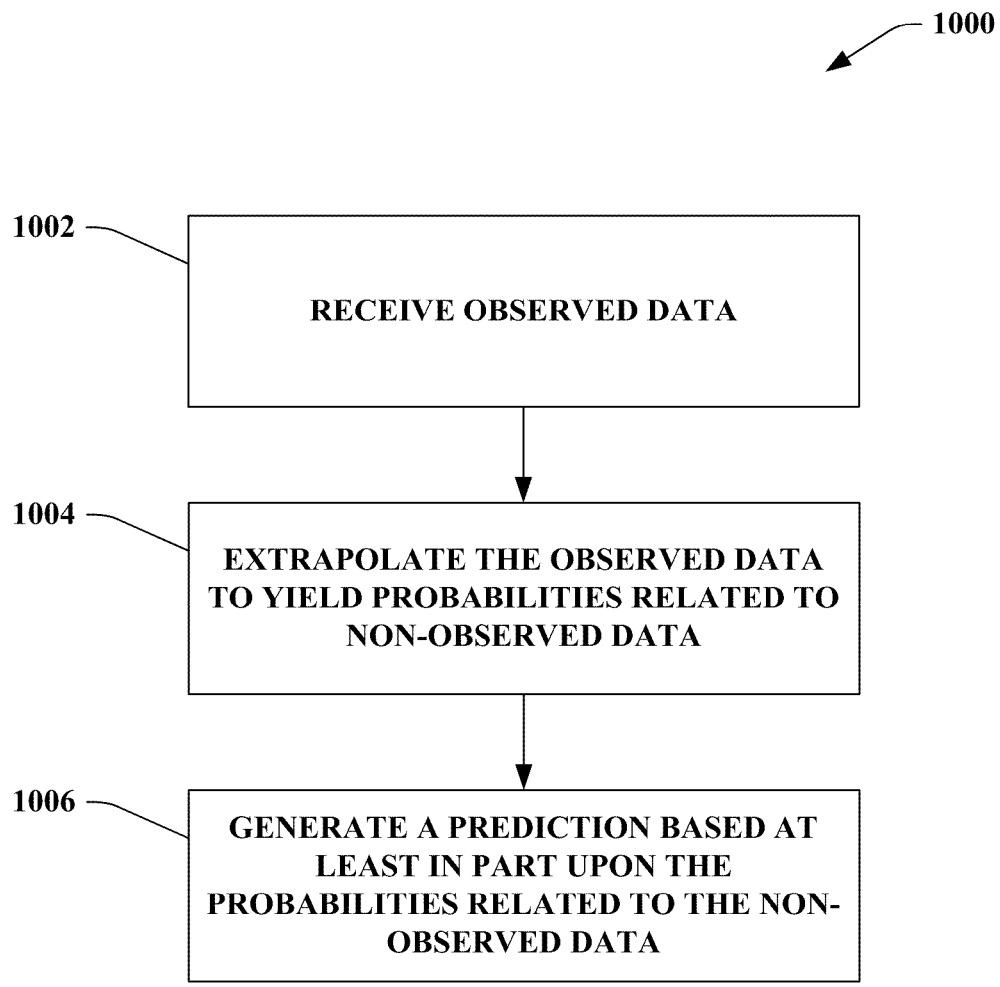
FIG. 10 illustrates an exemplary methodology that facilitates handling incompleteness of data logs to enable generating a prediction.
Figure 11:
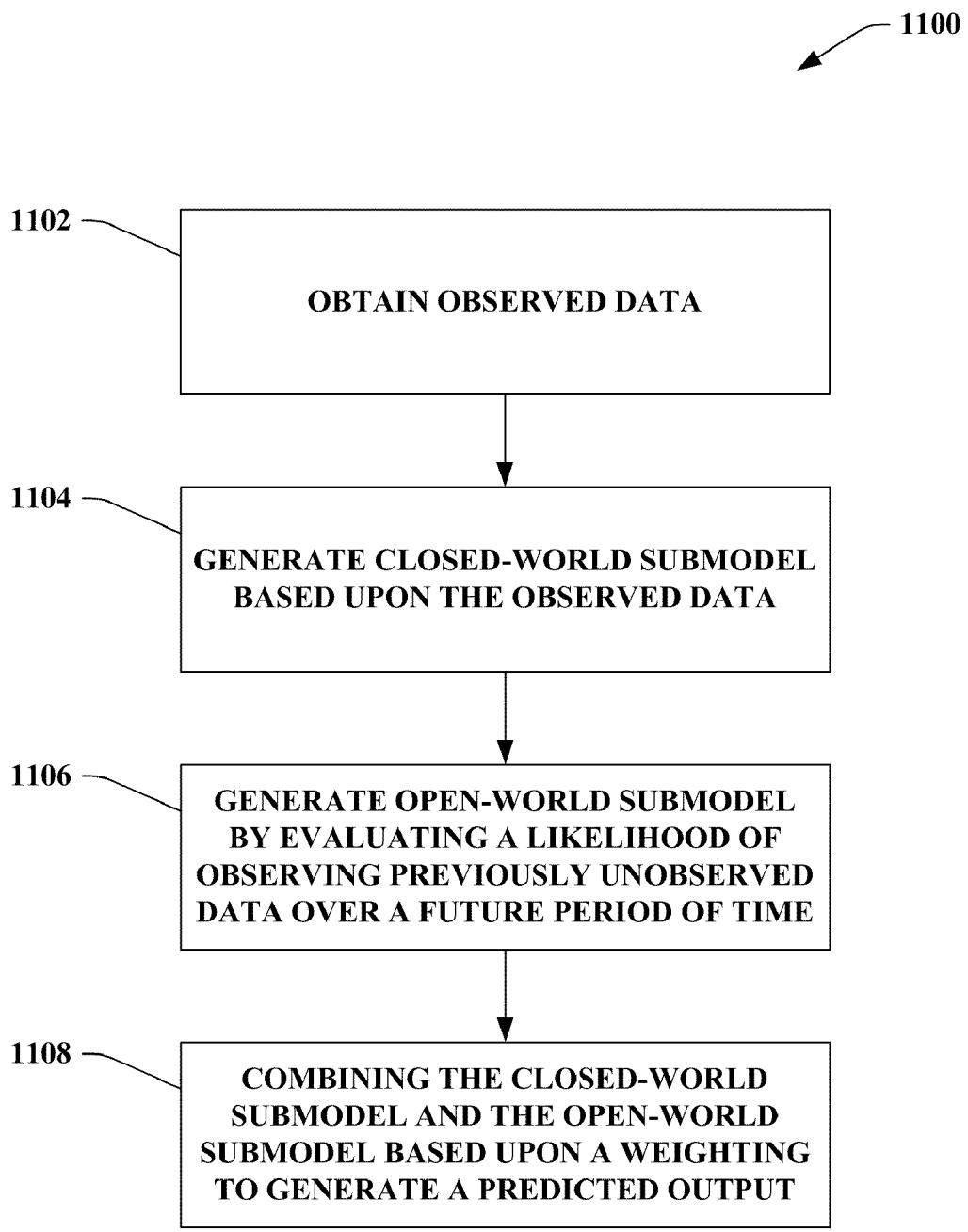
FIG. 11 illustrates an exemplary methodology that facilitates performing open-world decomposition to generate a predicted output.
Figure 12:
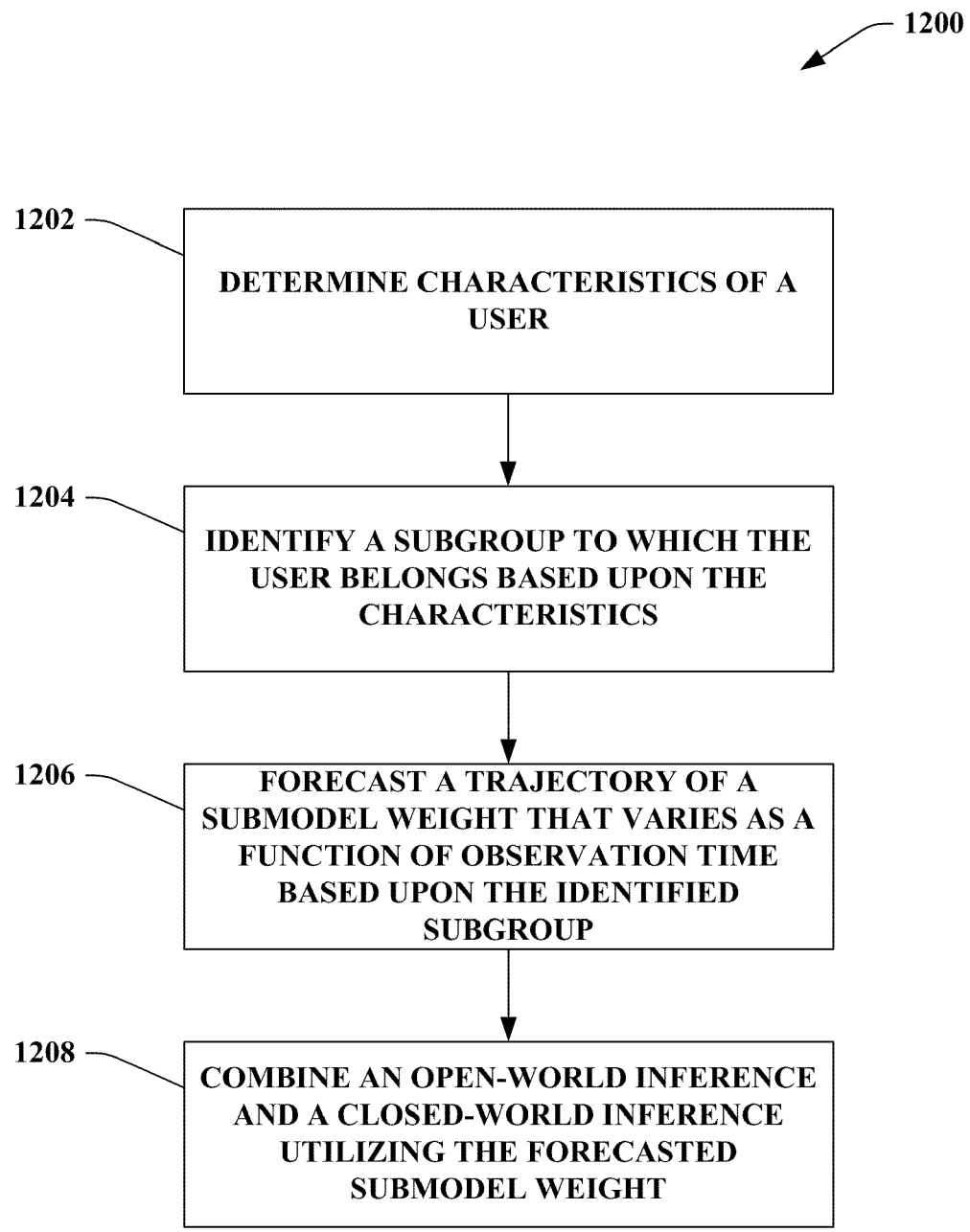
FIG. 12 illustrates an exemplary methodology that facilitates combining open and closed-world inferences based upon a weight associated with a particular user.

FIGS. 10-12 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 10, illustrated is a methodology 1000 that facilitates handling incompleteness of data logs to enable generating a prediction. At 1002, observed data can be received. For instance, the observed data can relate to any type of information pertaining to a person, a machine, a natural condition, and so forth. According to an illustration, the observed data can be associated with observed destinations of a user, weather conditions, and the like. At 1004, the observed data can be extrapolated to yield probabilities related to non-observed data. Pursuant to an example, trend analysis can be performed to characterize how observational data can change given ongoing data collection. Further, such trend analysis can be utilized to improve prediction accuracy. At 1006, a prediction can be generated based at least in part upon the probabilities related to the non-observed data.

Now referring to FIG. 11, illustrated is a methodology 1100 that facilitates performing open-world decomposition to generate a predicted output. At 1102, observed data can be obtained. At 1104, a closed-world submodel can be generated based upon the observed data. The closed-world submodel can be based upon inferences associated with the observed data, for instance. At 1106, an open-world submodel can be generated by evaluating a likelihood of observing previously unobserved data over a future period of time. According to an example, the open-world submodel can consider a spatial distribution that can provide a number of geometric parameters that can be functions of geometry associated with destinations already visited, frequency of visiting the destinations, nature of the destinations, and the like. At 1108, the closed-world submodel and the open-world submodel can be combined based upon a weighting to generate a predicted output. The weighting can be static and/or can vary dynamically with a length of observation. For instance, at the beginning of an observation, the open-world submodel can be weighted more heavily as compared to the closed-world submodel. Further, as the observation continues, the weight associated with the closed-world submodel can be increased in comparison to that of the open-world submodel. Moreover, the predicted output can be provided to a user (e.g., by way of a visual and/or audible signal) and/or a disparate component.

With reference to FIG. 12, illustrated is a methodology 1200 that facilitates combining open and closed-world inferences based upon a weight associated with a particular user. At 1202, characteristics of a user can be determined. For instance, the characteristics can relate to gender, age, marital status, parental status, employment, education, political affiliation, etc. At 1204, a subgroup to which the user belongs can be identified based upon the characteristics. For example, any number of potential subgroups can be formed. Further, an association between the user and one or more of the subgroups can be determined based upon demographics. At 1206, a trajectory of a submodel weight that varies as a function of observation time can be forecasted based upon the identified subgroup(s). At 1208, an open-world inference and a closed-world inference can be combined utilizing the forecasted submodel weight.

Figure 13:
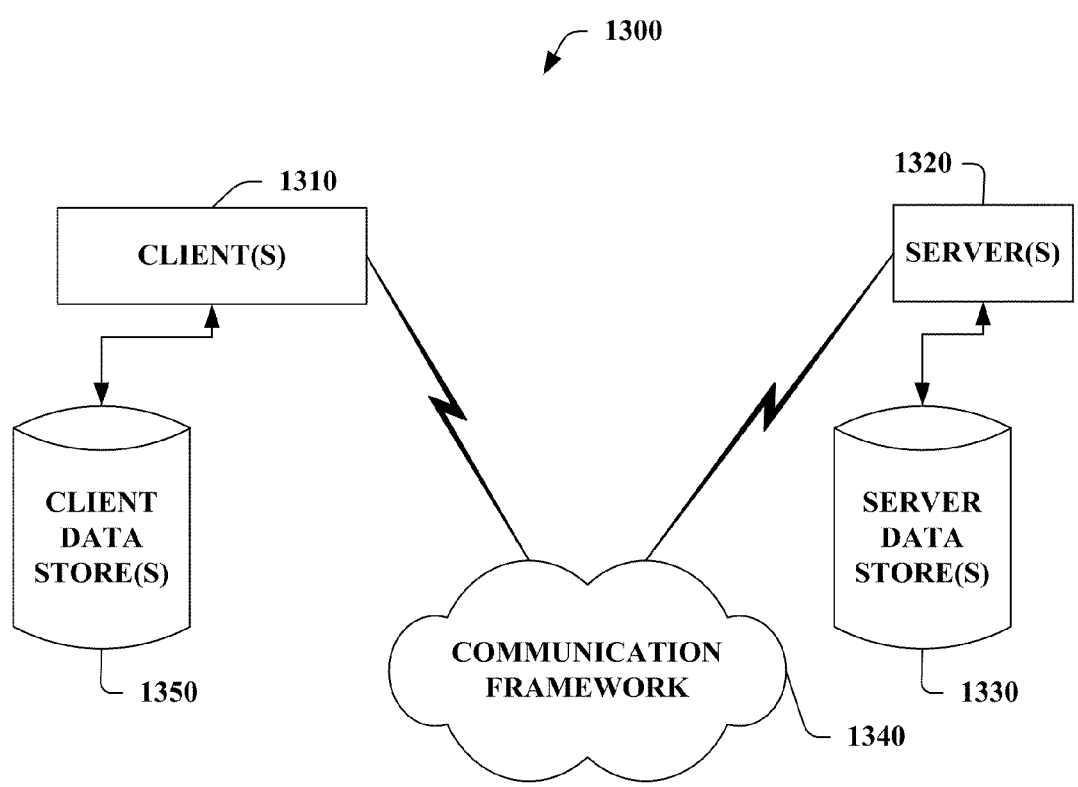
FIG. 13 illustrates an exemplary networking environment, wherein the novel aspects of the claimed subject matter can be employed.
Figure 14:
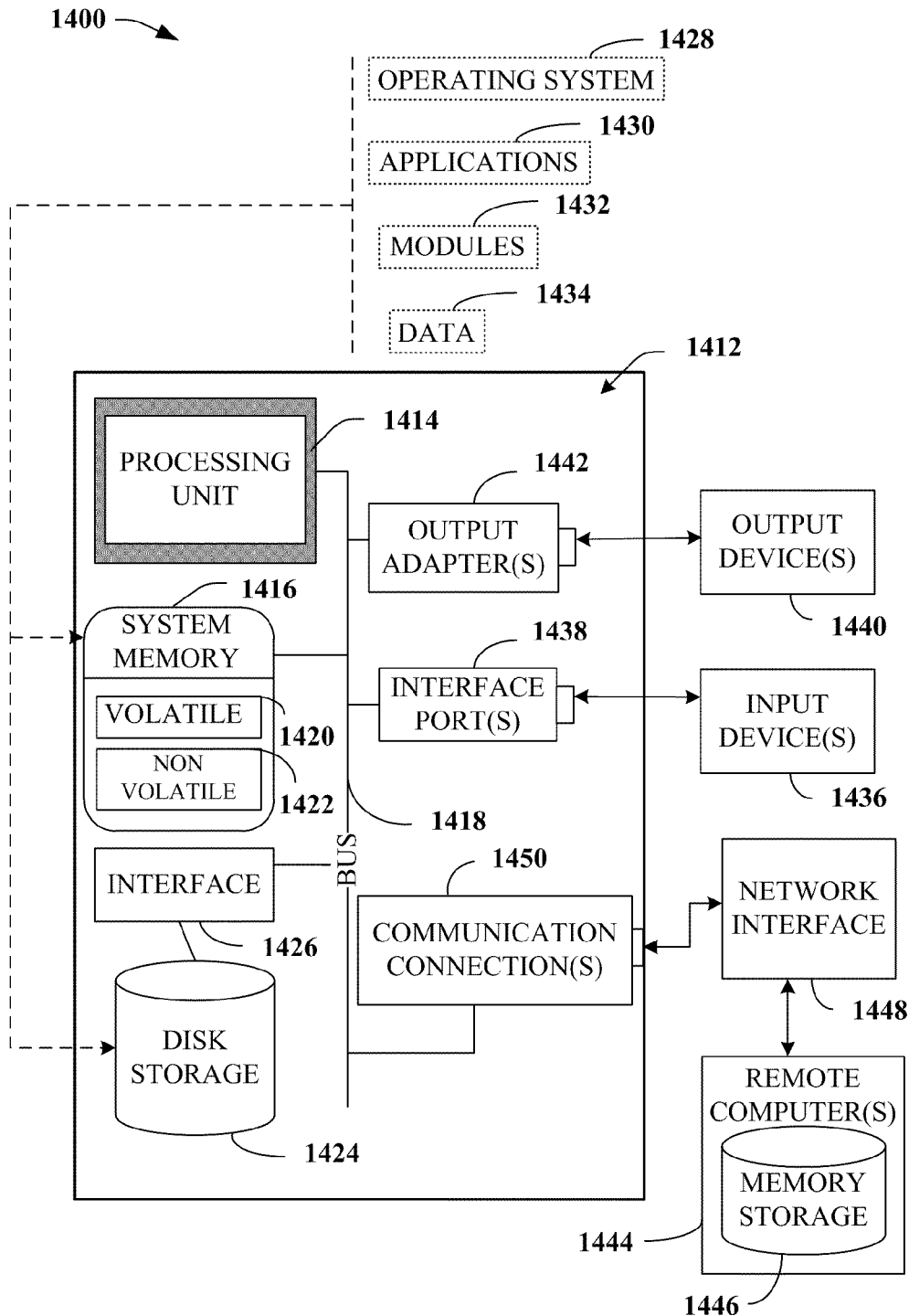
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. For instance, FIGS. 13-14 set forth a suitable computing environment that can be employed in connection with generating predictions utilizing open-world modeling techniques that perform extrapolations upon observed data to provide probabilities related to non-observed data. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates generating an inference about a destination of a current trip, comprising:
   a component that makes a log of previously observed events; and
   a modeling component, comprising at least one processor, that generates predictions of an event based at least in part upon a combination, the combination being a combination of outputs of:
      an open-world submodeling component that provides probabilities that events that are not in the log are likely to occur, the open world submodeling component inferring the probabilities by distributing probabilities over unobserved events; and
      a closed-world submodeling component that provides probabilities that events in the log are likely to recur, the closed-world submodeling component inferring the probabilities based on information in the log that indicates probabilities that previously observed events will recur,
   wherein the modeling component generates a prediction of a future event by combining, for each of a plurality of locations, a probability provided by the open-world submodeling component and a probability provided by the closed-world submodeling component.

2. The system of claim 1, wherein:
   the open-world submodeling component reasons about a likelihood of seeing previously unobserved states given a specific observational context.

3. The system of claim 1, wherein:
   the modeling component effectuates open-world decomposition by using the open-world model and the closed-world model to generate the predictions.

4. The system of claim 1, wherein:
   the open-world submodeling component generates probabilities that events that are not in the log are likely to occur based on demographics of a user.

5. The system of claim 1, wherein:
   the open-world submodeling component models the probabilities related to the events that are not in the log based upon a spatial distribution.

6. The system of claim 5, wherein:
   the open-world submodeling component models the spatial distribution as a probability distribution over a distance from previously observed destination of a trip.

7. The system of claim 1, wherein:
   the modeling component further comprising a weighting component that combines the probability provided by the open-world submodeling component and the probability provided by the closed-world submodeling component.

8. The system of claim 7, wherein:
the weighting component fuses a weighted combination of probabilities provided by the open-world submodeling component and the closed-world submodeling component as a function of duration of data collection.

9. The system of claim 8, wherein:
the weighting component employs curve fitting to model a change in a likelihood that an event will occur over time.

10. The system of claim 7, further comprising:
a profile component that generates a weight utilized by the weighting component based upon a consideration of user related characteristics.

11. The system of claim 1, further comprising a content component that provides information associated with an event that is predicted.

12. A method that facilitates handling incompleteness of data sets to enable generating a prediction, comprising:
with at least one processor:
receiving observed data;
computing, based on the observed data, probabilities of previously observed events recurring; and
extrapolating the observed data to yield probabilities related to non-observed events; and
generating a prediction of an event based at least in part upon a combination, the combination being a combination of the probabilities related to the non-observed events and the previously observed events, wherein the probabilities are weighted in forming the combination by a dynamic factor to place greater emphasis on probabilities related to the previously observed events when the amount of received data increases.

13. The method of claim 12, wherein:
extrapolating the observed data further comprises performing trend analysis to characterize how observational data changes given ongoing data collection.

14. The method of claim 12, the method further comprises:
generating a closed-world submodel based upon the observed data, the closed-world submodel being used to generate the probabilities of previously observed events recurring; and
generating an open-world submodel by evaluating a likelihood of observing the non-observed data over a future period of time, the open-world submodel being used to generate the probabilities of previously non-observed events occurring.

15. The method of claim 14, wherein:
combining the closed-world submodel and the open-world submodel further comprising:
determining characteristics of a user;
identifying a subgroup to which the user belongs based upon the characteristics;
forecasting a trajectory of a submodel weight that varies as a function of observation time based upon the identified subgroup; and
combining the closed-world submodel and the open-world submodel by utilizing the forecasted submodel weight.

16. The method of claim 14, generating the open-world submodel further comprising distributing probabilities associated with non-observed data based upon an analysis of spatial trends.

17. The method of claim 12, wherein:
the weight varies dynamically with a length of observation.

18. The method of claim 12, further comprising presenting relevant content based upon the prediction.

19. A computer readable storage device comprising computer-executable instructions that, when executed by at least one process perform a method that facilitates generating a prediction, the method comprising:
generating a closed-world inference based upon observed data, the closed world inference indicating a probability of recurrence of at least one event that has previously been observed;
generating an open-world inference by evaluating a probability of observing previously non-observed data over a future period of time; and
combining the closed-world inference and the open-world inference based upon a weight to yield the prediction, the weight being based on an amount of observed data.

20. The computer readable storage device of claim 19, wherein:
the method further comprises computing the weight based on data collected for a group of people deemed to have a common profile.

* * * * *